Figure 3:
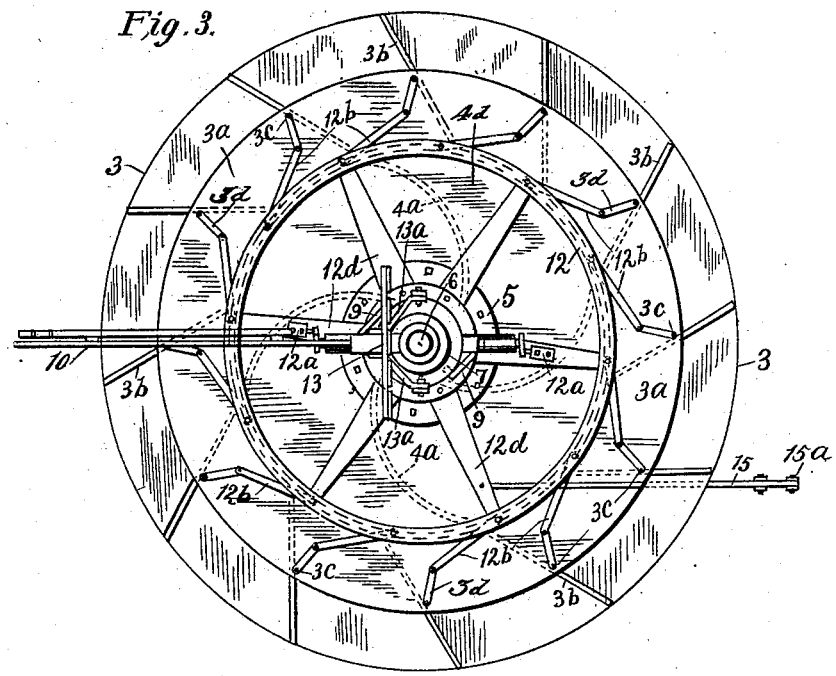

No. 863,715. PATENTED AUG. 20, 1907.
J. W. HIGBY & J. A. MILLER.
WIND TURBINE.
APPLICATION FILED OCT. 30, 1905.
2 SHEETS—SHEET 1.
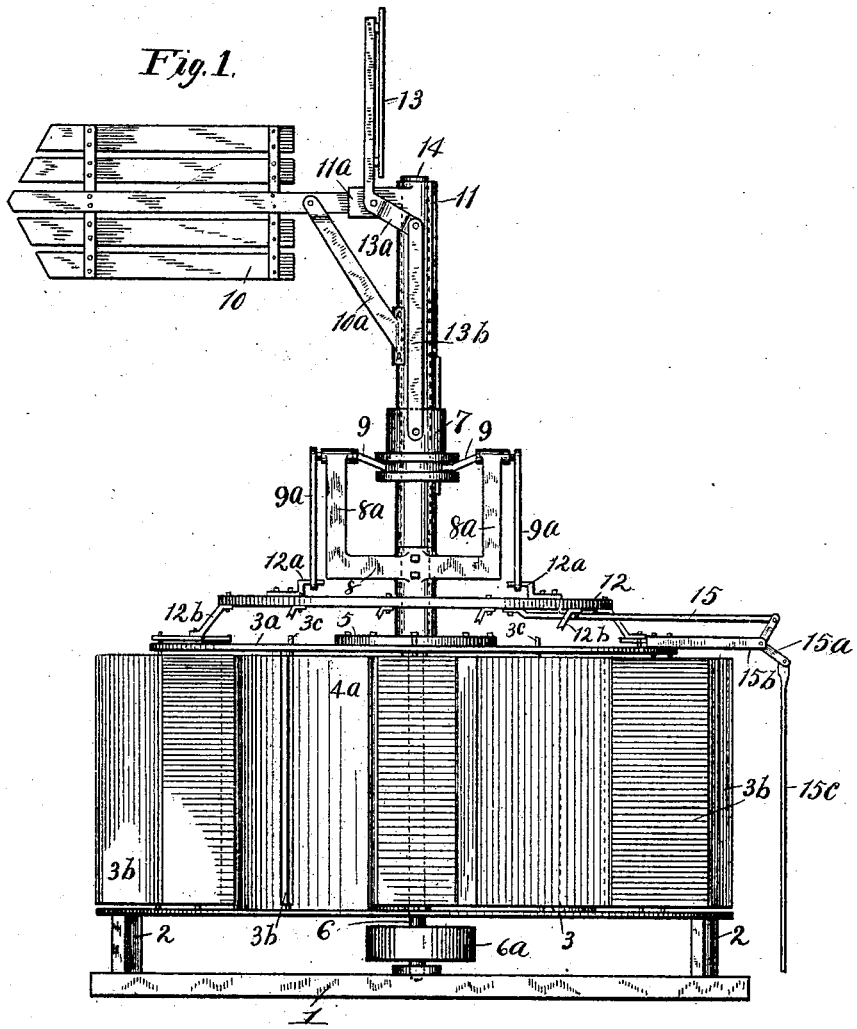
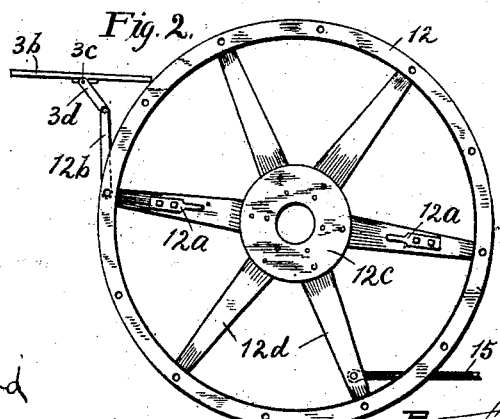
WITNESSES
J. H. Bassett
M. A. Milord
INVENTORS
J. W. Higby
J. A. Miller
By Frederick Benjamin
ATT.

No. 863,715. PATENTED AUG. 20, 1907.
J. W. HIGBY & J. A. MILLER.
WIND TURBINE.
APPLICATION FILED OCT. 30, 1905.

2 SHEETS—SHEET 2.

WITNESSES

INVENTORS
J. W. Higby
J. A. Miller
By Frederick Benjamin
ATT'Y

UNITED STATES PATENT OFFICE.

J. WALTER HIGBY AND JOHN A. MILLER, OF TROUT CREEK, MONTANA.

WIND-TURBINE.

No. 863,715.  Specification of Letters Patent.  Patented Aug. 20, 1907.

Application filed October 30, 1905. Serial No. 284,976.

*To all whom it may concern:*

Be it known that we, J. WALTER HIGBY and JOHN A. MILLER, citizens of the United States, residing at Trout Creek, in the county of Missoula and State of Montana, have invented certain new and useful Improvements in Wind-Turbines, of which the following is a specification.

Our invention relates to improvements in windmills of the type in which the wind wheel is arranged horizontally and in which guides or deflectors are combined to efficiently conduct the air currents to the surface of the wind wheel.

An important object of our improvements is to provide practically operative means for adjusting the guide vanes or shutters so that the force and amount of wind impinging on the blades of the wind wheel may be controlled.

A further object is to provide simple means for throwing the mill out of service when the wind reaches a velocity which would be likely to injure the apparatus.

A still further special object is to provide automatic as well as manually controlled means for governing the functions of the power developing parts of the mill.

Objects of general utility are conserved by our improvements as will be readily apparent to those skilled in the art to which this invention relates.

The device is designed to be supported by a frame sufficiently large to surround the motor, but as this framework forms no part of our invention and its illustration and description would tend to obscure the details of the drawing, and needlessly cumber the specification, only so much of the foundation frame has been shown as will suffice to clearly indicate the mutual relations of the parts.

In the accompanying drawing which forms a part of this application we have shown a preferred embodiment of our invention in the following views:—

Figure 4:
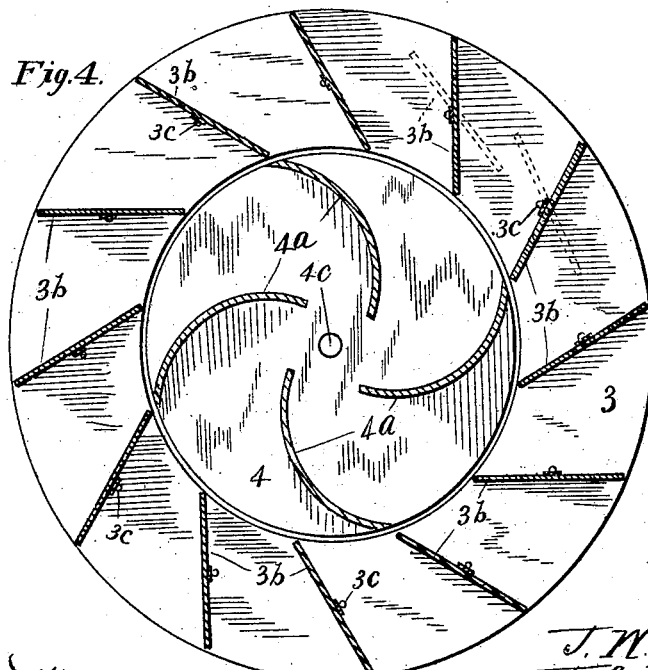

Figure 1 is an elevation of our improved wind mill complete; Fig. 2 is a detail of the shutter controlling elements; Fig. 3 is a top plan view of the wind mill, and Fig. 4 is a horizontal section through the wind wheel and its casing including the shutters.

Referring to the drawings in detail, 1 represents the base on which the operative parts of our wind mill are supported.

2 are short vertical posts which are secured to the base and support the annular platform 3 which forms the floor of the casing.

$3^a$ is a circular roof arranged above the platform a suitable distance and forms a part of the casing. Mounted on pins $3^c$ which extend through suitable openings in the platform and roof are shutters $3^b$ which are set tangentially to the periphery of the roof but are permitted a limited rotary movement. These shutters are so spaced that they may be set to deflect a greater or less amount of air against the wind wheel, or when in their extreme adjustment, will practically exclude all air from said wheel.

4 represents the bottom of the wheel case and $4^d$ the top of same, both of which parts are circular disks and through the center of same are shaft openings $4^c$.

$4^a$ are the wheel blades which are curved as shown and are rigidly secured to the top and bottom $4^d$, 4, and terminate before reaching the center thus leaving an open space through which the air passes when deflected from said blades.

5 indicates a circular iron plate which is rigidly bolted to the top $4^d$ of the wheel case and affords a bearing for the vertical shaft 6. The shaft 6 is journaled at its lower end in a suitable bearing plate secured to the base 1, passes through the openings $4^c$, its upper end is journaled in the plate 5 and it has keyed thereon a pulley $6^a$, and the wind wheel above described.

Rigidly secured on a post 14 is a yoke 8 having a hub and two upwardly extending vertical arms $8^a$. Above this yoke a hollow shaft 11 surrounds the post 14, rests on the hub of the bracket, and upon it is slidably and non rotatably mounted a grooved collar 7. In the ends of the arms $8^a$ are journaled cranks 9 the inner ends of which loosely engage the annular groove in the collar 7, and the outer ends are connected with the upper ends of links $9^a$, $9^a$.

10 represents a horizontally arranged vane of well known form and construction and same is connected with the tubular shaft 11 and braced by bracket $10^a$.

13 indicates an auxiliary vane which is secured to the upper portion of the bent levers $13^a$ which are pivotally mounted on the horizontal extension $11^a$ of the shaft 11. The lower ends of the levers are connected with the collar 7 by links $13^b$ which are arranged on opposite sides of the shaft 11. The post 14 is firmly secured at its lower end in the plate 5 and the shaft 11 is free to rotate thereon.

12 is the shutter controlling wheel, and same consists of an annular rim, a hub plate $12^c$ having a central opening for the shaft 6, and radial spokes $12^d$ which connect the rim with the hub plate. This wheel is mounted on the shaft 6 below the yoke 8. To the periphery or rim of the wheel are pivoted links $12^b$ the outer ends of which are connected with the arms $3^d$ of the shutter pintles $3^c$, so that as the wheel is partially rotated on the shaft 6, the shutters will be adjusted at different angles relative to the wind-wheel blades. Secured to two of the spokes of the wheel on opposite sides of the shaft are brackets $12^a$ the ends of which loosely engage the lower ends of the links $9^a$. To one of the spokes of said wheel is pivoted one end of a rod 15 the other end of which is connected with one of the arms of a bell crank 15ª which is pivotally mounted on the outer end of an arm 15ᵇ bolted to the top 3ª. The other arm of the bell crank is connected with an operating rod 15ᶜ which extends downwardly in reach for manual operation.

The operation of a wind mill constructed substantially as shown and described will be as follows:—When the rod 15ᶜ is released so that the wheel 12 can turn freely, the small vane 13 will stand vertically with its face at right angles to the direction of the wind being controlled in such position by the greater area of the vane 10. The shutters being free to adjust themselves to the direction of the wind will present their edges and thus permit the maximum amount of wind to impinge against the blades of the wind wheel. If the wind blows hard enough to overcome the weight of the collar 7 which is made sufficiently heavy to counterbalance the vane 13 and hold it vertically under normal conditions, the vane will be forced backwardly thus raising the collar 7 on the shaft 11 and rock the shafts 9 swing the lower ends of the rods 9ª, and, through the connection of said rods, with the dogs 12ª partially rotate the shutter controlling wheel and thereby adjust the angle at which the shutters stand so as to decrease the amount of air admitted to the wheel.

It will be noted that the central portion of the wind-wheel is open so that the currents of air when striking the concave faces of the blades 4ª may be deflected from one blade so as to impinge on the surface of the opposite blade thus applying to all the available area of the wind wheel the full force of the wind with the minimum strain on the parts which lie in its path.

Having thus described my invention what I claim as new and desire to secure by Letters Patent, is:—

1. A windmill, including a frame-work, a shaft, a wind motor carried on said shaft, a casing surrounding said motor and having shutters adapted to deflect the air currents centripetally, a post fixed to said casing, a movable sleeve on said post, directing and regulating vanes carried on said sleeve, a grooved collar arranged to move vertically on said sleeve, connections between said regulating vanes and said collar, and connections between said collar and said shutters.

2. A wind motor, including a frame-work, a vertical shaft, a wind-wheel fixed on said shaft and having a series of radially arranged curved wings, a casing surrounding said motor and having shutters adapted to deflect the air currents upon the said wings, a post fixed to said casing, a movable sleeve on said post, directing and regulating vanes mounted on said sleeve, a grooved collar arranged to move vertically on said sleeve, operative connections between said regulating vanes and said collar, and connections between said collar and the shutters.

3. A wind motor, including a frame-work, a vertical shaft, a wind-wheel carried on said shaft, said wheel consisting of horizontally curved wings connected by top and bottom plates, a casing surrounding said motor and having shutters arranged to swing on vertical axes, a post fixed to said casing, a movable sleeve on said post, directing and regulating vanes mounted on said sleeve, a grooved collar arranged to move vertically on said sleeve, operative connections between said regulating vanes and said collar, and connections between said collar and shutters to control the angular positions of the latter.

4. A wind motor, including a frame-work, a vertical shaft, a wind-wheel having top and bottom plates connected by vertical wings curved in a horizontal plane and fixed to said shaft, a casing surrounding said motor and having shutters arranged to swing on vertical axes, a post fixed to said casing, a movable sleeve, directing and regulating vanes mounted on said sleeve, a grooved collar arranged to move vertically on said sleeve, operative connections between said regulating vanes and said collar, and a wheel disposed concentrically with said post and having connections with said grooved collar and the movable shutters.

5. A wind motor, including a frame-work, a vertical shaft, a wind-wheel having top and bottom plates connected by curved wings, fixed to said shaft, a casing surrounding said motor and having shutters arranged to swing on vertical axes, a post fixed to said casing, a movable sleeve on said post, directing and regulating vanes mounted on said sleeve, a horizontal wheel mounted concentric with said fixed post and having pivotal connection with the said shutters, operative connections between said regulating vanes and the shutters, the said connection consisting of a grooved collar, a link pivoted to said grooved collar, and bell-crank levers between said collar and wheel.

6. A wind motor including a frame, a vertical shaft, a wind wheel having radial curved wings fixed to said shaft, a casing having shutters surrounding the said motor and arranged to move on a vertical axis, a post fixed to said casing, a movable sleeve on said post, directing and regulating vanes on said sleeve, a grooved collar arranged to move vertically upon said sleeve, connections between the vanes and said collar, a yoke fixed to said post, a horizontal wheel mounted concentric with said post and having arms pivotally connected to said shutters, a bell-crank lever journaled in said yoke, one of the arms of said lever engaging the groove in said collar and the other connected to said wheel.

In testimony whereof we affix our signatures in presence of two witnesses.

J. WALTER HIGBY.
JOHN A. MILLER.

Witnesses:
M. B. DEWEY,
G. W. PHELPS.